Dec. 8, 1970          M. AUPHAN          3,545,869
DEVICE FOR THE COLORIMETRIC ANALYSIS OF LIQUIDS
Filed March 21, 1967

INVENTOR.
MICHEL AUPHAN
BY
AGENT

United States Patent Office 3,545,869
Patented Dec. 8, 1970

3,545,869
DEVICE FOR THE COLORIMETRIC ANALYSIS OF LIQUIDS
Michel Auphan, Neuilly-sur-Seine, France, assignor, by mesne assignments, to U.S. Philips Corporation, New York, N.Y., a corporation of Delaware
Filed Mar. 21, 1967, Ser. No. 624,945
Claims priority, application France, Apr. 4, 1966, 56,241
Int. Cl. G01j 3/50; G01n 21/24, 33/16
U.S. Cl. 356—181
5 Claims

ABSTRACT OF THE DISCLOSURE

A device for the colorimetric analysis of liquids, especially blood employing a cuvette which directs the liquid in the form of a jet at a photosensor, light for analysis being supplied only via the jet of liquid.

---

This invention relates to devices for the colorimetric analysis of liquids and more particularly for the analysis of very small quantities of liquid.

Colorimetry is a measuring method which is commonly used in analysis and more particularly in medical analysis where the liquid to be analysed and a reference liquid are illuminated by the same photometer and the intensities measured are compared.

For medical analyses and more particularly blood analyses it is necessary to work with minimum quantities of liquid (for example a few cubic millimetres), which small quantities make the use of ordinary colorimetric cuvettes substantially impossible.

The present invention provides a novel device for colorimetric analysis which is suitable especially for the analysis of small quantities of liquid.

According to the invention the device for the colorimetric analysis of liquids and more particularly for the analysis of small quantities of liquid, including a photodetector, has a container for liquid provided with a narrow outlet aperture for leading out the liquid in the form of a jet, said container being arranged opposite the photodetector so that the photodetector is struck by the jet of liquid, the light required for the analysis being supplied to the photodetector only via the jet of liquid.

Figure 1:
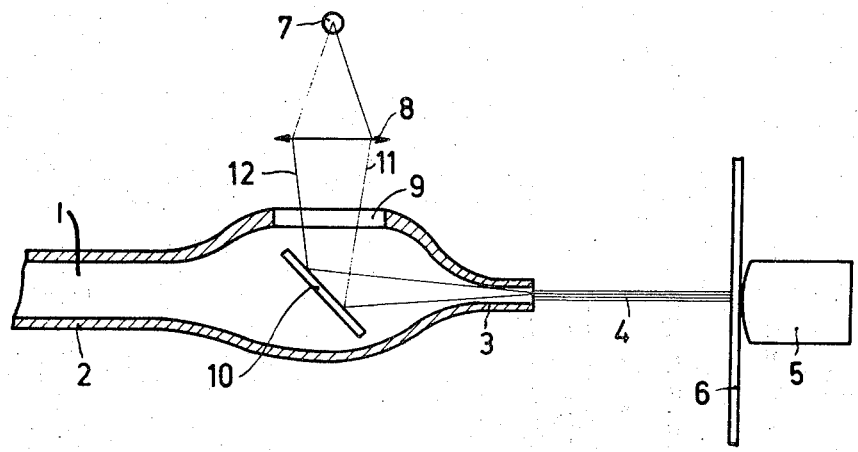
Figure 2:
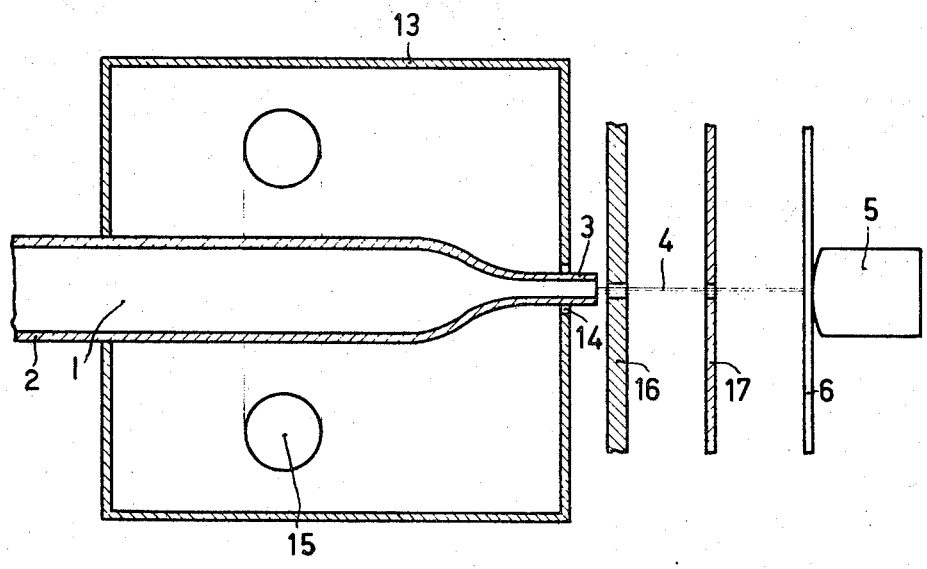

In order that the invention may be readily carried into effect it will now be described in detail, by way of example, with reference to the accompanying diagrammatic drawing, in which:

FIG. 1 shows a first embodiment of a colorimeter according to the invention, and FIG. 2 shows a second embodiment thereof.

A container 2 contains a small amount (at least 4 mm.[3]) of liquid 1, for example blood, which has been especially prepared as a function of the analysis to be performed. At one end the container 2 merges into a tube 3 which consists of, for example, glass or any other material that absorbs light rays only to a small extent. The tube 3 has a narrow aperture so that the liquid flows out towards a photometer 5 in the form of a jet 4. The jet is received by a transparent plate 6, for example of glass, which is placed in front of the photodetector 5. The plate 6 has to be cleaned after each measurement. The tube 3 is illuminated by a light source 7 placed outside the container and via a lens 8, the light rays reach the tube 3 through an optical window 9 formed in the wall and via a mirror 10 arranged at an angle of 45°. The light beam is indicated by 11 and 12. The jet of liquid guides the light in the manner of a glass fibre, the rays being unable to pass out owing to the total reflection. A light-tight enclosure (not shown) surrounds the light-source 7 and container 2 to prevent light from reaching the photodetector 5 except through the liquid.

The photodetector 5, which has been previously calibrated with a known sample, gives a measure of the amount of light received which originates from the jet of liquid.

In FIG. 2, corresponding parts of the device are indicated by the same reference numerals as in FIG. 1. The tube 3 is now illuminated without utilising the optical window 9 and the 45° mirror 10. A different method of illumination of the aperture of emergence for the jet of liquid is made possible by the fact that in a space having internally reflecting walls and only small apertures and containing light sources of large dimensions relative to the said apertures, the amount of light passing through the said apertures is substantially independent of the location of the light source and substantially equal to the radiation product of the said source through the plane of the aperture.

The holder 2 containing the liquid 1 and provided with the tube 3 is placed in a space 13 formed by totally reflecting walls. The tube 3 is arranged in an aperture 14, formed in one of the walls of the space 13. The illumination takes place by means of an annular lamp 15. The jet of liquid 4 constitutes the axis of the emerging light beam and among the numerous possible light paths there are always several which introduce light into the jet 4. Parasitic light cannot reach the glass plate 6, which protects the photodetector 5, due to the presence of diaphragms 16 and 17 which are provided with apertures for the liquid jet.

When the device is used for successive measurements with regular intervals, for example in an automatic measuring apparatus, and for different samples of liquid present in small amounts, the light source may be formed by flash tubes which are switched-in intermittently and flashed on at regular intervals at the instants when the jet of liquid is most stable. Under these conditions the various jets of equal amounts of liquid are illuminated in the same manner.

The invention is not confined to the embodiments above described and, without passing beyond the scope of the invention, modifications may be made more particularly to the location of the light source and mirror and to the characteristics of each of its elements.

What is claimed is:

1. A device for the colorimetric analysis of small amounts of liquids of the order of a few cubic millimeters comprising a container for the liquid having a nozzle for releasing the liquid in the form of a jet, a photoresponsive device positioned in the path of the jet of the liquid emerging from said outlet aperture, a light-transparent member positioned between the outlet aperture and the photoresponsive device for intercepting the liquid jet, and illuminating means comprising a light source positioned off the nozzle axis and reflector means for directing said light onto said axis and said liquid jet which conducts the light to the photoresponsive device for analysis.

2. A device as claimed in claim 1, wherein the jet of liquid directed towards the photometer strikes a transparent target plate placed in front of the photoresponsive device, the light carried along by the jet being produced by at least one light source and guided towards the outlet aperture of the container for the liquid by at least one reflective element.

3. A device as claimed in claim 2, characterized in that the light source is housed in a space having internally reflecting walls provided with an outlet aperture for the jet of liquid.

4. A device as claimed in claim 3, characterized in that the light source is formed by an annular radiator which surrounds the jet of liquid inside the said space and which is focused on the axis of the jet of liquid.

5. A device as claimed in claim 3, characterized in that in an apparatus for successive measurements at regular intervals the light source is formed by a flashlight lamp.

References Cited

UNITED STATES PATENTS

| | | | |
|---|---|---|---|
| 2,839,963 | 6/1958 | Moss et al. | 250—218X |
| 2,827,825 | 3/1968 | White | 88—14ZT |
| 2,863,319 | 12/1958 | McLin | 73—425.4 |
| 2,940,355 | 6/1960 | Cary | 88—14SE |
| 3,333,107 | 7/1967 | Hubbard et al. | 88—14SHX |
| 3,349,762 | 10/1967 | Kapany | 128—2.05 |
| 3,412,254 | 11/1968 | Meyer-Doering | 250—222 |

OTHER REFERENCES

"The Automatic Counting of Red Blood Cells," E. H. Cooke-Yarborough et al., Brit. J. of Appl. Phys. Sup. 3, April 1954, pp. S147-150.

RONALD L. WIBERT, Primary Examiner

R. J. WEBSTER, Assistant Examiner

U.S. Cl. X.R.

250—218; 356—39, 40, 246

UNITED STATES PATENT OFFICE
CERTIFICATE OF CORRECTION

Patent No. 3,545,869      Dated December 8, 1970

Inventor(s) MICHEL AUPHAN

It is certified that error appears in the above-identified patent and that said Letters Patent are hereby corrected as shown below:

Column 1, line 60, change "photometer" to read

--photodetector--;

Column 3, line 6, change "flashlight" to read

--flash--;

line 7, change "lamp" to read

--tube--.

Signed and sealed this 16th day of March (SEAL)
Attest:

Edward M. Fletcher, Jr.
Attesting Officer

WILLIAM E. SCHUYLER, J
Commissioner of Patent